United States Patent [19]

Szewczyk

[11] 3,982,478

[45] Sept. 28, 1976

[54] FOOD PREPARATION AND STORAGE DEVICE

[76] Inventor: Edward T. Szewczyk, 2578 Royal View Drive, Allison Park, Pa. 15101

[22] Filed: Nov. 3, 1975

[21] Appl. No.: 627,896

[52] U.S. Cl. .................................. 99/419; 99/447
[51] Int. Cl.² ........................................ A47J 37/04
[58] Field of Search ............ 99/419, 339, 358, 420, 99/421, 428, 441, 447

[56] References Cited
UNITED STATES PATENTS

| | | | |
|---|---|---|---|
| 1,879,146 | 9/1932 | Estrin | 99/426 UX |
| 1,882,363 | 10/1932 | Keyting | 99/419 X |
| 1,902,564 | 3/1933 | Mabey | 99/419 |
| 1,984,027 | 12/1934 | Lyons | 99/428 UX |
| 2,005,395 | 6/1935 | Rothfeld | 99/419 X |
| 3,552,303 | 1/1971 | Parrish | 99/447 |
| 3,582,356 | 6/1971 | Thomas | 99/447 X |

Primary Examiner—Peter Feldman
Assistant Examiner—Arthur O. Henderson
Attorney, Agent, or Firm—Buell, Blenko & Ziesenheim

[57] ABSTRACT

An apparatus for cooking or storing foods. The food is prepared on a skewer in its own individual cooking chamber to reduce the amount of energy used in cooking. Each cooking chamber is provided with a receptacle for collecting grease drippings and the like to facilitate cleaning for reuse. The prepared food can also be refrigerated in its individual chamber for storage.

6 Claims, 3 Drawing Figures

FOOD PREPARATION AND STORAGE DEVICE

This invention relates to an apparatus for the preparation, cooking and storage of food products and in particular to a device that acts as both efficient cooking unit and a freezing or storing container. Traditional methods for cooking food products require large amounts of energy in proportion to the amount actually needed to cook the food. This is particularly true where the item to be cooked is rather small or compact. When foods of this kind are cooked by traditional methods, large amounts of energy are expanded to heat an oven or other cooking utensil. Much of this energy used to heat the oven or a fry pan is merely lost and wasted. In view of the high cost of energy and the scarcity of it, the traditional methods for cooking such small and compact foods is not either facile, economical or efficient. In addition, traditional ovens and fry pans also use energy in that they require hot water, electricity or some combination of both for cleaning after use.

The present invention greatly reduces the amount of energy required to cook individual food items such as weiners, sausage and the like. Further, the apparatus of the invention lends itself to a facile and efficient cleaning after use for either cooking or storage.

In a preferred form of my invention, I provide a base means made of aluminum having 8 individual heating elements. Each of the heating elements is a small directional source and is sized to accommodate the conductive member of the base of the individual cooking chambers. The heating elements can either be conventional electric or gas elements and can be activated either individually or in any combination. For simplicity of construction and portability, I prefer that the cooking elements be electrical.

The individual cooking chambers of my invention are comprised of a base, a thermally insulative cooking cylinder and a lid. The base member is composed of a thermally conductive material such as aluminum enclosed in a thermal insulator such as ceramic. The aluminum base member includes a skewer mount and skewer which are also aluminum. The skewer mount is insertable by means of slots into the base. The skewer is frictionally insertable into the skewer mount. The conductive base, skewer mount and skewer form a low resistance heat funnel for funneling heat to the food which is mounted on the skewer. The ceramic member of the base contains slots in which the cooking cylinder is placed, the lid is placed over the cylinder to form a closed chamber.

Cooking is accomplished by inserting food on the skewer and placing the closed cooking chamber on an individual heating element. Once the food is cooked, the chamber is removed from the heating element. The food can then be stored in the chamber as is, or removed for immediate use. In the event that grease or the like had accumulated during cooking, the chamber can be cleaned by merely removing the cooking cylinder and pouring off the grease. Also, due to the structure of the invention, the grease caused by cooking is removed from immediate contact with the food thereby making it, in most cases, more palatable. Once the grease had been poured off from the container, it would be immediately ready for reuse.

In the foregoing general description, I have set out certain purposes, objects and advantages of my invention. Other objects, purposes and advantages will be apparent from the consideration of the following descriptions and drawings in which.

Figure 2:
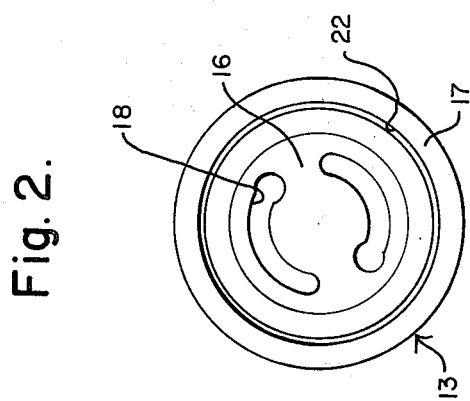
FIG. 2 is a transverse sectional view of a cooking chamber taken on line II—II in FIG. 1.

Referring to the drawings, I have illustrated a base 10 made of aluminum with standard electrical heating elements 11. The heating elements can be activated either singularly or in combination by means of a standard on/off switch or rheostat, not shown. The individual cooking chambers 12 are comprised of base member 13, cylindrical cooking cylinders 14 and lids 15. Base member 13 has an inner conductive core 16 of aluminum enclosed in a thermally insulative ceramic 17. The ceramic 17 acts as an insulator to prevent dissipation of heat from the aluminum core. Slots 18 in core 16 are adapted to receive skewer mount 19. Mount 19 is also made of conductive aluminum. Skewer 20 is insertable in slot 21 of mount 19. Core 16, mount 19 and skewer 20 comprise a low resistance thermal path for the heat from element 11 to the food to be cooked. Cooking cylinder 14 is insertable in grooves 22 of the ceramic portion of base 13. Cooking cylinder 14 is also made of an insulative ceramic material. Lid 15 is adapted to engage cylinder 14 and form a closed cooking chamber.

In operation, a food to be cooked such as sausage, is placed on skewer 20. Lid 15 is placed on cylinder 14 to close the chamber. Chamber 12 is placed on element 11 with conductive base 16 in contact therewith. Element 11 is activated and the heat funneled through conductive core 16, skewer mount 19 and skewer 20 to the food. This allows the food to cook slowly and efficiently from the center. The cooking cylinder increases the thermal efficiency by trapping the heat that leaves the outer surface of the food. This trapped heat creates a higher temperature around the meat reducing the heat loss at the outer surface of the food. The heat held between the outer surface of the food and the inner surface of the cylinder can also be used to cook or warm additional items which can be placed as desired in the chamber. Any grease or the like from the food would be free to move downward below the level of the food onto skewer mount 19.

Once the food has been cooked, lid 15 would be removed and the food taken off the skewer, or the skewer can be used as a handle for the food and pulled from slot 21. The chamber is easily cleaned by merely pouring the grease or other drippings out of the chamber into a waste receptacle. If it were desirable to store the food for any length of time, the grease or other drippings could be removed in a like manner, and lid replaced and the cooking chamber used as a storage chamber.

Figure 3:
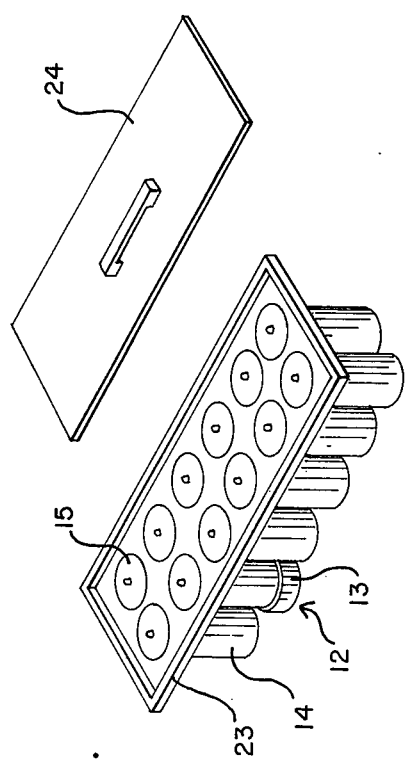
FIG. 3 is an isometric view of an arrangement of multiple cooking chambers.
Figure 1:
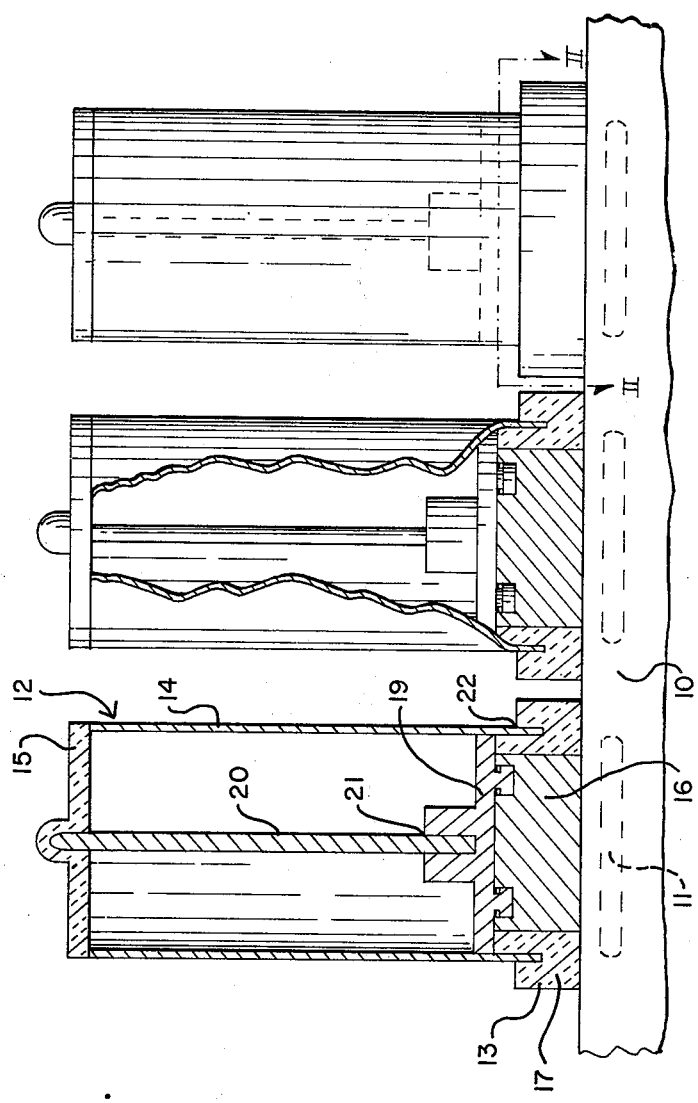
FIG. 1 is an elevational view of three cooking chambes partially in section and partially in elevation.

FIG. 3 shows an embodiment of my invention, with 12 individual cooking chambers 14 having a common grid 23 insertable over and around cylinders 12 and a common lid 24. The embodiment of FIG. 3 would be used when a number of items were to be cooked at the same time. The number of units in the embodiment of FIG. 3 could be varied depending upon the number of elements 11 in base 10.

In the foregoing specification, I have set out certain preferred embodiments of my invention, however, it will be understood that this invention may otherwise be embodied within the scope of the following claims.

I claim:
1. A device for preparing and storing food comprising:
   a. an element base member having a thermally conductive heating element therein,
   b. a cooking chamber comprised of a base member, cylindrical wall members and a lid member, said members adapted to form a closed chamber,
   c. said base of said cooking chamber member having a conductive core adapted to engage said heating element and heat transfer means adapted to conduct heat from said element and said base; and
   d. receptacle means within said cooking chamber to receive drippings from said food.
2. The apparatus of claim 1 wherein, said base member is comprised of a conductive core circumferentially surrounded by an insulative material, said core being adapted to receive a skewer mount means and said skewer mount means being adapted to frictionally engage a skewer means.
3. The apparatus of claim 2 wherein, the conductive members are made of aluminum and the insulative members are made of ceramic.
4. An apparatus for preparing and storing food comprising:
   a. an element base member having a plurality of cooking elements contained therein,
   b. a plurality of cooking chambers adapted to engage said cooking elements, said cooking chambers being comprised of a base member and a cylindrical wall member,
   c. said base members of said chambers having a conductive core adapted to engage said heating elements and heat transfer means for conducting heat from said elements and said core,
   d. receptacle means within said cooking chamber for receiving food drippings and the like; and
   e. lid means adapted to engage said chambers and close same.
5. The apparatus of claim 4 wherein said base member of said cooking chambers is comprised of a conductive core circumferentially surrounded by an insulative material, said core being adapted to receive a skewer mount means and said skewer mount being adapted to frictionally engage a skewer means.
6. The apparatus of claim 5 wherein, the conductive members are made of aluminum and the insulative members are made of ceramic.

* * * * *